United States Patent
Taivalsaari et al.

(10) Patent No.: US 6,279,148 B1
(45) Date of Patent: Aug. 21, 2001

(54) METHOD AND APPARATUS FOR SUPPORTING EFFICIENT PROGRAMMING IN DYNAMIC POINTER-SAFE LANGUAGES

(75) Inventors: Antero K. P. Taivalsaari, Cupertino; David M. Ungar, Palo Alto, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/170,321

(22) Filed: Oct. 13, 1998

(51) Int. Cl.[7] ............................. G06F 9/45; G06F 19/06
(52) U.S. Cl. ................................ 717/1; 717/6; 107/206; 709/104
(58) Field of Search ........................... 717/1, 5; 707/205, 707/206; 709/104

(56) References Cited

U.S. PATENT DOCUMENTS

| | | | |
|---|---|---|---|
| 5,088,036 | * 2/1992 | Ellis et al. | 707/206 |
| 5,845,298 | * 12/1998 | O'Connor et al. | 707/206 |
| 5,893,121 | * 4/1999 | Ebrahim et al. | 707/206 |
| 5,900,001 | * 5/1999 | Wolczko et al. | 707/206 |
| 5,903,900 | * 5/1999 | Knippel et al. | 707/206 |
| 5,911,144 | * 6/1999 | Schwartz et al. | 707/206 |
| 5,915,255 | * 6/1999 | Schwartz et al. | 707/206 |
| 5,920,876 | * 7/1999 | Ungar et al. | 707/206 |
| 5,930,807 | * 7/1999 | Ebrahim et al. | 707/206 |
| 5,953,736 | * 9/1999 | O'Connor et al. | 717/1 |
| 6,038,572 | * 3/2000 | Schwartz et al. | 707/206 |
| 6,049,810 | * 4/2000 | Schwartz et al. | 707/206 |
| 6,098,089 | * 8/2000 | O'Connor et al. | 709/104 |

OTHER PUBLICATIONS

Schmidt et al.; "Performance of a hardware–assisted real–time garbage collector". ACM Digital Library[online], Proceedings of the 6th international conference on Architectural support for programming languages and operating systems, p76(10), Oct. 1994.*

Allard et al.: "Real–time programming in Common Lisp". ACM Digital Library[online], Communications of the ACM, v34, iss9, p64(6), Sep. 1994.*

Abdullahi, S.; "Garbage Collecting the INternet: A Survey of Distributed Garbage Collection". ACM Digital Library [online], ACM Computing Surveys, v30, iss3, p330(44), Sep. 1998.*

Ju et al.; "On performance and space usage improvements for parallelized compiled APL code". Proceedings of the international conference on APL 1991, p234(10), Aug. 1991.*

Gosling et al.;"The Java Language Environment: A White Paper". Sun Microsystems Incorporated, Palo Alto, CA, Chapters 5–6, May 1996.*

Hoff, A.; "The Case for Java as a Programming Language". IEEE Xplore[online], IEEE Internet Computing, vol. 1, iss 1, pp 51–56, Jan. 1997.*

Taivalsaari, A.; "Implementing a Java Virtual Machine in the Java Programming Language". Sun Microsystems Incorporated, Accessed on 2000–08–27, Retrieved from the Internet: http://www.sun.com, Mar. 1998.*

Lindholm et al.; "The Java Virtual Machine Specification". Sun Microsystems Incorporated, Palo Alto, CA, Chapters 3 and 7, Sep. 1996.*

Krall et al; "CACAO–A 64–bit Java VM just–in–time complier". Concurrency: Practice and Experience, vol. 9(11), pp1017–1030, Nov. 1997.*

* cited by examiner

*Primary Examiner*—Mark R. Powell
*Assistant Examiner*—Kelvin Booker
(74) *Attorney, Agent, or Firm*—Park, Vaugham & Fleming LLP

(57) ABSTRACT

One embodiment of the present invention facilitates low-level systems programming in dynamic, "pointer-safe" programming languages, which disallow arbitrary references through pointers. It does so by avoiding the creation of object instances in the traditional fashion. Rather, a large heap is defined to store dynamically allocated data objects, and explicit memory management operations are implemented in order to allocate and deallocate memory from the heap. Traditional object pointers are replaced by indices to the heap. The described technique allows the bypassing of traditional object allocation, thus making object allocation static from the viewpoint of the pointer-safe programming language—with the exception of the large array that is allocated to serve as the heap. Since the new memory system is implemented on top of an existing automatic memory system, varying degrees of automatic and manual memory management are possible.

20 Claims, 3 Drawing Sheets

```
public int get_raw (int object, int offset) {
      return heap [object + offset];
}
```

```
public void set_raw (int object, int offset, int value) {
      heap [object + offset] = value;
}
```

METHOD AND APPARATUS FOR SUPPORTING EFFICIENT PROGRAMMING IN DYNAMIC POINTER-SAFE LANGUAGES

BACKGROUND

1. Field of the Invention

The present invention relates to "pointer-safe" computer programming languages, which prevent arbitrary references through pointers. More specifically, the present invention relates to a method and an apparatus for supporting efficient systems programming within a dynamic, pointer-safe programming language.

2. Related Art

Object-oriented programming languages with automatic memory management, such as the JAVA™ programming language of Sun Microsystems, Inc. of Palo Alto, Calif., are widely recognized for making software development easier. Unlike conventional programming languages such as C or C++ that require programmers to use pointers and explicit memory allocation operations to manage dynamic data structures, languages such as the Java programming language take care of memory management automatically. This eliminates the need for tedious and error-prone pointer manipulation. Languages such as the Java programming language are sometimes referred to as "pointer-safe" languages, because they largely eliminate errors that can arise during pointer manipulation. Pointer-safe programming languages are generally languages that do not allow programmers to manipulate pointers outside of the context of, or in violation of, a type system.

Sun, the Sun logo, Sun Microsystems, and Java are trademarks or registered trademarks of Sun Microsystems, Inc. in the United States and other countries.

Another important characteristic of the Java programming language is the dynamic nature of the language. Unlike C or C++, in which the source program is compiled directly into native, platform-specific machine code, a Java program is executed in an interpretive fashion. This allows programs to be extended dynamically at runtime, and makes them highly portable across different computing devices and platforms.

However, while dynamic, pointer-safe languages excel at making software development faster and less error-prone by relieving the programmer of the burden of explicitly allocating memory and manipulating pointers, they are not commonly used for "systems programming." In systems programming, a programmer needs more explicit control of object allocation and deallocation in order to more efficiently map data structures onto low-level, machine-dependent structures, and to better manage performance issues related to memory management.

Programmers have traditionally recognized a trade-off between good programming style on one hand and control over memory management on the other. Programming languages with automatic memory management relieve the programmer of the responsibility of explicit memory management, and this generally leads to better programming style. However, at the same time these languages provide less control over memory allocation and pointer manipulation during execution, thus making the behavior of the program harder to understand. While languages with automatic memory management often provide reasonable performance in typical application programming tasks, in certain "systems programming" tasks (such as implementing efficient virtual machines for new programming languages or for real-time applications) the reduced control over memory management can cause performance problems, especially when implementing the system using a dynamic programming language.

Presently, programmers typically do not use dynamic programming languages with automatic memory management for systems programming tasks, but instead write systems programs using other, less elegant programming languages such as C or C++.

What is needed is a mechanism that allows efficient, systems programming tasks to be implemented in a higher-level, dynamic, pointer-safe language such as the Java programming language.

SUMMARY

One embodiment of the present invention facilitates low-level systems programming in "pointer-safe" programming languages, which disallow arbitrary references through pointers. It does so by avoiding the creation of object instances in the traditional fashion. Rather, a large heap is defined to store dynamically allocated data objects, and explicit memory management operations are implemented in order to allocate and deallocate memory from the heap. Traditional object pointers are replaced by indices to the heap (hereafter referred to as "object identifiers") Thus, one embodiment of the present invention provides a system for facilitating efficient programming within a pointer-safe programming language. The system operates by defining a large array within the pointer-safe programming language. Next, the system receives a request to allocate a data object, the request including a specified size for the data object. In response to this request, the system allocates a space for the data object within the large array at a position specified by an array index within the large array, such that the space is large enough to accommodate the specified size for the data object. Next, the system receives a request to access the data object, which includes the array index. In response to this request, the system uses the array index to access the data object within the large array. The above-described technique bypasses traditional object allocation, thus making object allocation static from the viewpoint of the pointer-safe programming language—with the exception of the large array that is allocated to serve as the heap.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave.

In the following disclosure and preceding discussion, many of the structures are described in terms of the Java programming language and supporting utilities. However, the present invention is not limited to implementations involving the Java programming language. The present invention may apply to any pointer-safe programming language. Hence, any mention of a Java programming language feature or associated utility is meant to apply to analogous structures in other systems that support pointer-safe programming languages.

"Pointer-safe" programming languages are generally languages that do not allow programmers to manipulate pointers outside of the context of, or in violation of, a type system.

Additionally, many of the structures are described in terms of object-oriented programming languages. However, the present invention is not limited to programming languages that use the object-oriented programming paradigm. Hence, any mention of object structures and methods is meant to apply to analogous structures in other non-object-oriented systems that support pointer-safe programming languages.

Also, the present invention is not limited strictly to dynamic (interpreted) languages. However, the idea tends to be most useful in such systems, because dynamic (interpreted) languages tend to have more performance problems than programming languages that are compiled directly into machine code.

Computer System

Figure 1:
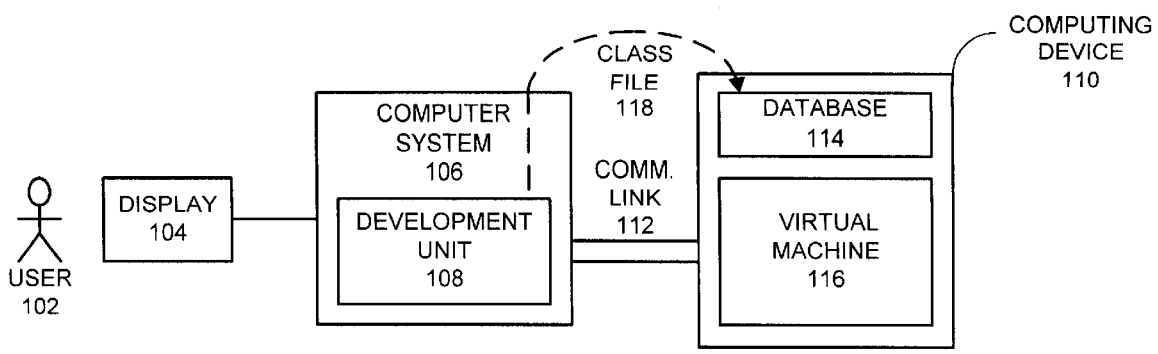
FIG. 1 illustrates a computer system including a virtual machine in accordance with an embodiment of the present invention.

FIG. 1 illustrates a computer system 106 and a computing device 110 including a virtual machine 116 in accordance with an embodiment of the present invention. In FIG. 1, computer system 106 may be any type of computer system capable of executing an application program. This includes, but is not limited to, a personal computer, a workstation, a mainframe computer system, a server computer system, a personal organizer device, and even a device controller. Computer system 106 contains development unit 108, which includes programming tools for developing platform-independent applications. A user 102 operates computer system 106 and views the output of computer system 106 through display 104.

Note that although the present invention is described in the context of a platform-independent computing system, the present invention is not specific to platform-independent computing systems. Hence, the present invention can also be applied to computing systems that do not support platform-independent applications.

Computer system 106 is coupled to computing device 110 through a communication link 112. Computing device 110 may take the form of any type of computing device or system including, but is not limited to, a mainframe computer system, a server computer system, a personal computer, a workstation, a laptop computer system, a palm-sized computer system, a personal organizer, and a device controller. Computing device 110 may also include computing devices that are embedded within other devices, such as a pager, a cellular telephone, a television, or an automobile. In general, computing device 110 may include any embedded computing device, including any computing devices embedded in an electrical/mechanical device, or other system or appliance.

Communication link 112 may include any type of permanent or temporary communication channel that can be used to transfer data from computer system 106 to computing device 110. This may include, but is not limited to, a computer network such as an Ethernet, a wireless communication network or a telephone line.

Computing device 110 includes database 114, for storing code and data, as well as a virtual machine 116 for processing platform-independent programs received across communication link 112.

During operation, class file 118 is created by development unit 108. Class file 118 contains components of a platform-independent program to be executed in computing device 110. For example, class file 118 may include methods and fields associated with an object-oriented class. Next, class file 118 is transferred from development unit 108 through communication link 112, and into database 114 within computing device 110. Finally, virtual machine 116 executes a program that accesses components within class file 118.

Virtual Machine Structure

Figure 2:
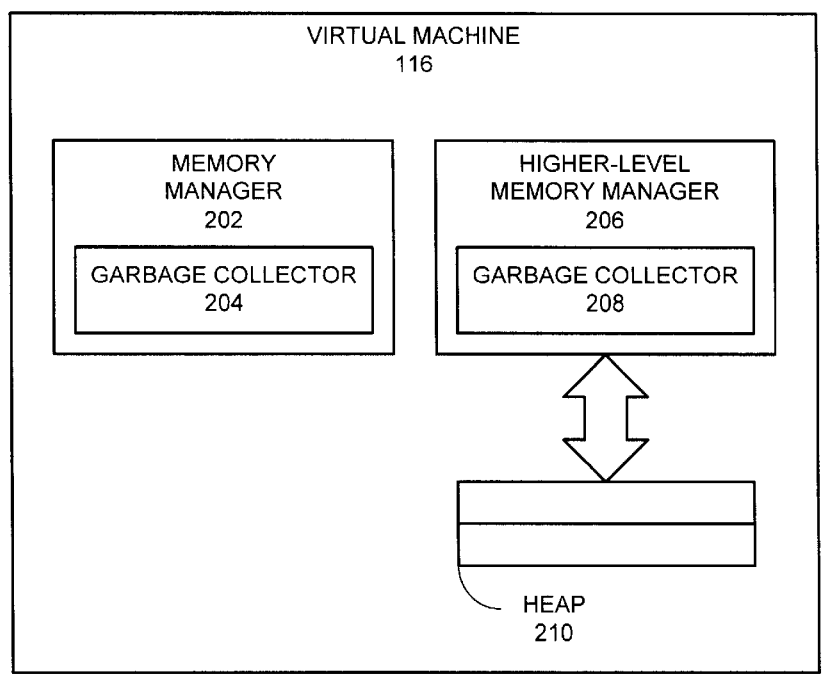
FIG. 2 illustrates part of the internal structure of a virtual machine in accordance with an embodiment of the present invention.

FIG. 2 illustrates part of the internal structure of a virtual machine 116 in accordance with an embodiment of the present invention. Virtual machine 116 provides a mechanism for running a single program across a wide range of computing platforms. Platform-independent virtual machine 116 includes memory manager 202 and higher-level memory manager 206. Memory manager 202 is a conventional memory manager that is primarily written in a lower-level programming language such as C or C++, which allows memory management operations to be performed efficiently.

In contrast, higher-level memory manager 206 is written in a high-level pointer-safe programming language. Higher-level memory manager 206 manages data objects allocated out of heap 210. In one embodiment of the present invention, heap 210 is a large integer array, which is allocated within the pointer-safe language during system initialization. In contrast, conventional memory manager 202 manages data objects from any location within the memory of computing device 110.

Both memory managers 202 and 206 include garbage collectors to reclaim storage space that becomes unused during program execution. More specifically, memory manager 202 includes garbage collector 204, and higher-level memory manager 206 includes garbage collector 208. Garbage collector 204 reclaims memory space from anywhere within the memory of computing device 110. Whereas, garbage collector 208 only manages data objects defined within heap 210. Note that heap 210 is illustrated as including two separate storage areas for data. This allows a copying garbage collector to copy data objects between the storage areas. Note that the present invention is not specific to copying garbage collectors, and that in general any type of garbage collector 208 can be used within higher-level memory manager 208.

Since it is possible to implement any kind of garbage collector on top of heap 210, the application programmer can use varying levels of automatic and manual memory management. This contrasts with the traditional programming style for languages such as the Java programming language, in which the programmer typically uses the built-in garbage collector. In certain cases, where more advanced garbage collectors, such as a train collector or generation scavenger, are implemented as part of higher-level memory manager 206, several integer heaps may be allocated.

During operation, higher-level memory manager 206 allocates and initializes data objects from heap 210. It returns indexes to these allocated objects, which act as pointers to these objects. These indexes allow the objects to be referenced from other parts of a computer program.

Heap Structure

Figure 3:
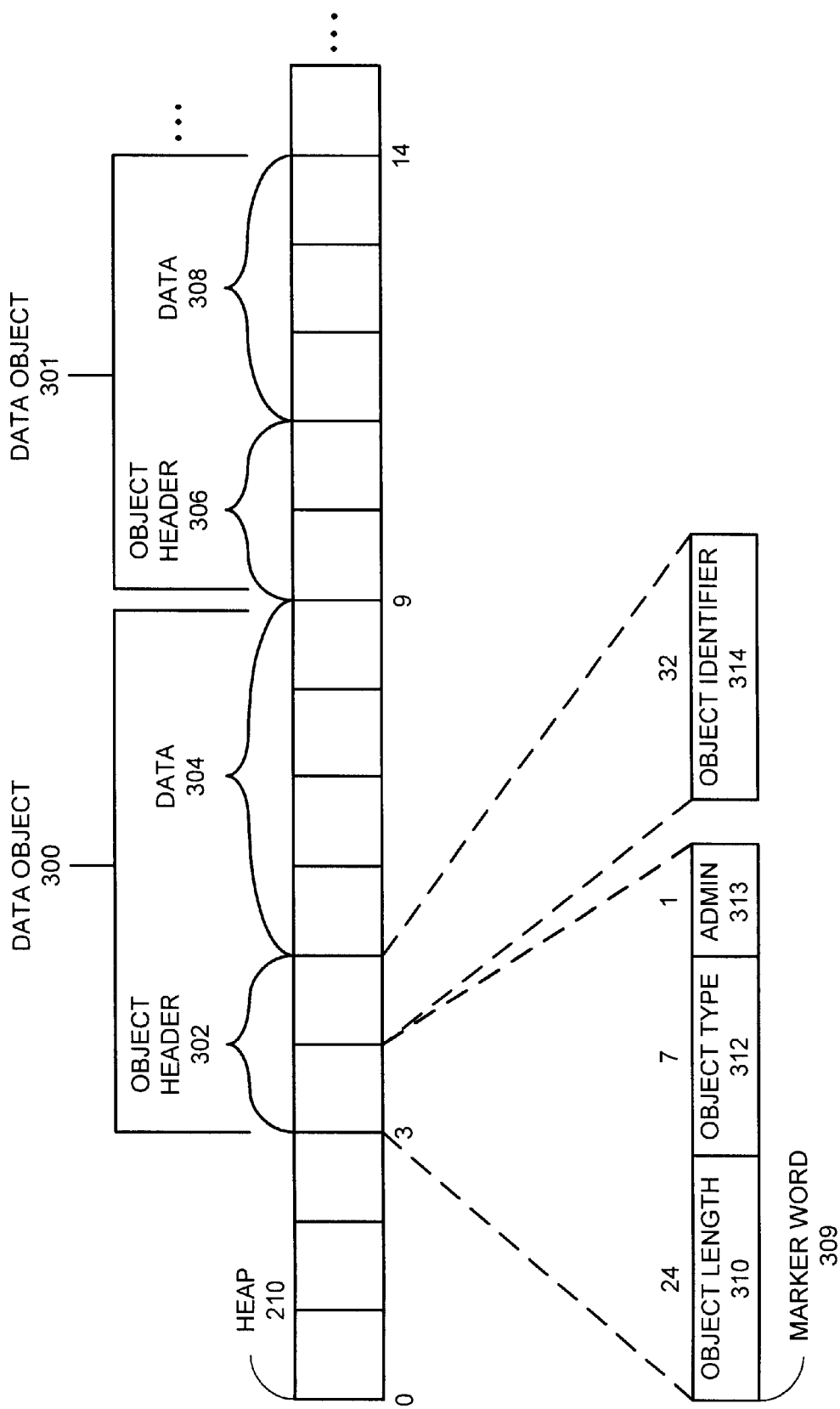
FIG. 3 illustrates the structure of data objects within a heap in accordance with an embodiment of the present invention.

FIG. 3 illustrates one possible structure for data objects within heap 210 from FIG. 2 in accordance with an embodiment of the present invention. In the example illustrated in FIG. 2, heap 210 takes the form of an integer array. However, any data structure that allows indexing of data items can be used to implement heap 210. Heap 210 includes data object 300, which occupies locations three through eight, and data object 301, which occupies locations nine through 13.

Data object 300 includes object header 302, which occupies locations three and four and data storage area 304, which occupies locations four through eight. Similarly, data object 301 includes object header 306, which occupies locations nine and 10, and data storage area 308, which occupies locations 11 through 13.

FIG. 3 illustrates one possible embodiment for object header 302 in more detail. In this embodiment, object header 302 occupies two 32-bit words. The first word is marker word 309, which includes object length 310, object type 312 and admin bit 313. Object length 310 is a 24-bit quantity that specifies the size of associated data storage area 304. In this case, object length 310 contains the value four, which indicates that data storage area 304 is four words long. Object type 312 contains a seven-bit code, which indicates the type of data stored in data storage area 304. For example, the data may be numeric integer data or string data.

Finally marker word 309 includes an admin bit 313, which is used by a garbage collection routine. A copying garbage collector may use admin bit 313 to indicate if a data object has been copied. A mark and sweep-type garbage collector may use admin bit 313 to indicate that a data object has been marked.

The second word in object header 302 includes object identifier 314, which uniquely identifies the associated data object. This allows data object 300 to retain its identity even after it is moved to a different location in heap 210 by a garbage collection or other memory management routine.

Note that the above-described structure of data object 300 and object header 302 describes only one possible implementation of the present invention. In other implementations, the structure of data object 300 and the specific sizes for the different fields within data object 300 and header 302 may vary.

Object Allocation

Figures 4, 5A, 5B:
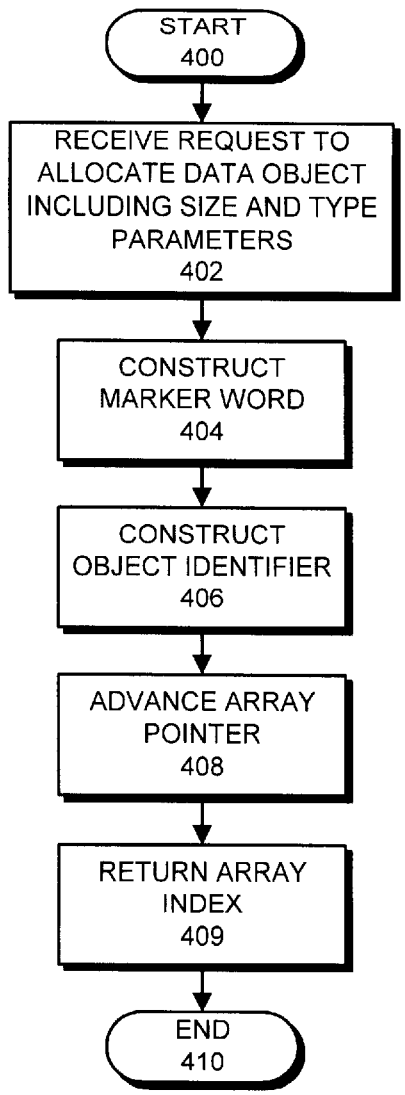
FIG. 4 is a flow chart illustrating the process of allocating a data object in a heap in accordance with an embodiment of the present invention.
FIG. 5A illustrates code for a function that retrieves data from an object within the heap in accordance with an embodiment of the present invention.
FIG. 5B illustrates code for a function that writes data to an object within the heap in accordance with an embodiment of the present invention.

FIG. 4 is a flow chart illustrating the process of allocating a data object in a heap in accordance with an embodiment of the present invention. In one embodiment of the present invention, data items are mapped to the objects in heap 210 by following a programming convention in which each object-oriented language class implements a method called "instantiate" to allocate a new object from heap 210 rather than from a traditional object heap. The resulting object identifier is then explicitly used whenever that object needs to be accessed.

More specifically, referring the FIG. 4, the system receives a request to allocate a data object. This request typically takes the form of a method invocation or function call that allocates the data object. This invocation or function call includes parameters specifying the size and type of the data object to be allocated (state 402). In response the this request, the system constructs a marker word, such as marker work 309 from FIG. 3, specifying the object length 310, the object type 312 and garbage collection status information 313 for the object (state 404). The system also constructs an object identifier 314, which uniquely identifies the object. This allows the object to be moved around heap 210 during the garbage collection or other memory management functions. Next, the system advances an array pointer to point past the end of the newly-allocated object to the next open space in heap 210 (state 408). Finally, the system returns an array index, which points to the start of the data storage area immediately following the pointer (state 410). In the example illustrated in FIG. 3, after allocating data object 300, the system returns an index with the value "five," which points to the start of data storage area 304. This allows portions of the data storage area 304 to be accessed by simply adding an offset to the returned index. Similarly, object header 302 can be referenced by subtracting one or two from the same index.

Object Manipulation

In one embodiment of the present invention, the process of accessing instance variables (the non-static fields of an object) requires the programmer to explicitly implement accessor methods (get, set) for each non-static field of each object oriented class. Usually these methods are implemented as static methods, requiring the object identifier to be passed as a parameter to the accessor methods whenever accessor methods are called.

FIG. 5A illustrates code for a function that retrieves data from an object within the heap in accordance with an embodiment of the present invention. This code receives an object index and an offset into the object. It adds the object index to the offset and uses this sum as an index to retrieve a data item from heap 210. In the illustrated example, the method "get_raw" returns an integer from heap 210, which is implemented as an integer array.

FIG. 5B illustrates code for a function "set_raw" that writes data to an object within the heap in accordance with an embodiment of the present invention. This code receives three integer parameters, including an object index, an offset into the object and a value to be written. It adds the object index to the offset and uses this sum as an index to write the value to the specified location within the object.

Example

The present invention leads to a different programming style when used in conjunction with conventional object-oriented programming languages such as the Java programming language. Object instantiation differs because the higher-level memory manager 206 allocates objects from a large heap 210. For example, in the Java programming language, an object and a string can be instantiated as follows:

Object o=new Object( . . . parameters . . . )

String s=new String( . . . parameters . . . )

In contrast, under the new approach, the object o and string s can be instantiated as follows:

int o=HeapObject.instantiate( . . . parameters . . . )
int s=HeapString.instantiate( . . . parameters . . . )

This new object o and string s can be accessed through the returned array indexes o and s using methods such as "get_raw" and "set_raw" illustrated in FIGS. 5A and 5B.

Object accessing also differs. For example, in the Java programming language, an object such as a bank account can be accessed as follows:

myBankAccount.withdraw(100);

This statement invokes a method "withdraw," which is associated with an object identifier "myBankAccount," and it specifies that 100 units are to be withdrawn from the corresponding account.

In contrast, under the new approach, the same operation may be specified as follows:

BankAccount.withdraw(myBankAccount, 100);

In this case, the identifier "BankAccount" specifies a class, and the method "withdraw" is defined within this class. This method takes in a parameter "myBankAccount," which identifies the bank account and a parameter "100," which indicates that 100 units are to be withdrawn from this bank account. Note that the identifier "myBankAccount" will be ultimately resolved into an integer index into heap 210. One major difference with this approach is that objects are manipulated through indexes into heap 210, which are passed as parameters into class methods.

Note that the above-described invention can be used in conjunction with traditional pointer-safe programming style. A programmer may allocate standard Java library objects in the conventional fashion relying on the standard garbage collector, and use the above-described approach only for certain objects in the system. For instance, when implementing command line interpreters or other similar facilities, one may want to use the above described technique to speed up stack frame management and other low-level features of the interpreter, while allowing the programmer to use the Java programming language in the normal fashion for other features.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for providing for efficient programming, comprising:

defining a large array within a programming language that does not allow manipulation of pointers outside of the context of a type system;

receiving a request to allocate a data object, the request including a specified size for the data object;

allocating a space for the data object within the large array at a position specified by an array index within the large array, such that the space is large enough to accommodate the specified size for the data object, the space containing an object header for storing information about the data object, including the specified size of the data object, type information for data stored in the data object, an identifier that uniquely identifies the data object, and a status bit that is used by a garbage-collection process;

receiving a request to access the data object, the request having the form of a method invocation, which includes the array index as a parameter;

using the array index to access the data object within the large array; and reclaiming unused entries within the large array through the garbage-collection process.

2. The method of claim 1, wherein the programming language includes the Java programming language.

3. A method for providing for efficient programming, comprising:

defining a large array within a programming language that does not allow manipulation of pointers outside of the context of a type system;

receiving a request to allocate a data object, the request including a specified size for the data object, wherein the data object includes an identifier that uniquely identifies the data object, and wherein the data object includes a status bit that is used by a garbage-collection process;

allocating a space for the data object within the large array at a position specified by an array index within the large array, such that the space is large enough to accommodate the specified size for the data object;

receiving a request to access the data object, the request including the array index;

using the array index to access the data object within the large array; and reclaiming unused entries within the large array through the garbage-collection process.

4. The method of claim 3, wherein the request to access the data object includes a request to read at least part of the data object.

5. The method of claim 3, wherein the request to access the data object includes a request to write to the data object.

6. The method of claim 3, wherein receiving the request to access the data object includes receiving a method invocation, which includes the array index as a parameter.

7. The method of claim 3, wherein the data object contains an object header for storing information about the data object.

8. The method of claim 7, wherein the object header includes the specified size of the data object and type information for data stored in the data object.

9. The method of claim 3, wherein the programming language includes the Java programming language.

10. A computer readable storage medium storing instructions that when executed by a computer cause the computer to perform a method for providing for efficient programming, comprising:

defining a large array within a programming language that does not allow manipulation of pointers outside of the context of a type system;

receiving a request to allocate a data object, the request including a specified size for the data object, wherein the data object includes an identifier that uniquely identifies the data object, and wherein the data object includes a status bit that is used by a garbage-collection process;

allocating a space for the data object within the large array at a position specified by an array index within the large array, such that the space is large enough to accommodate the specified size for the data object;

receiving a request to access the data object, the request including the array index; and using the array index to access the data object within the large array.

11. An apparatus for providing for efficient programming, comprising:

an initialization mechanism that defines a large array within a programming language that does not allow manipulation of pointers outside of the context of a type system;

an allocation mechanism that receives a request to allocate a data object, the request including a specified size for the data object, and that allocates a space for the data object within the large array at a position specified by an array index within the large array, such that the space is large enough to accommodate the specified size for the data object, wherein the data object includes an identifier that uniquely identifies the data object, and wherein the data object includes a status bit that is used by a garbage-collection process;

an access mechanism that receives a request to access the data object, the request including the array index, and that uses the array index to access the data object within the large array; and a reclaiming mechanism that reclaims unused entries within the large array through the garbage-collection process.

12. The apparatus of claim 11, wherein the request to access the data object includes a request to read at least part of the data object.

13. The apparatus of claim 11, wherein the request to access the data object includes a request to write to the data object.

14. The apparatus of claim 11, wherein the request to access the data object is in the form of a method invocation, which includes the array index as a parameter.

15. The apparatus of claim 11, wherein the data object contains an object header for storing information about the data object.

16. The apparatus of claim 15, wherein the object header includes the specified size of the data object and type information for data stored in the data object.

17. The apparatus of claim 11, wherein the programming language includes the Java programming language.

18. An apparatus for providing for efficient programming, comprising:

an initialization means for a large array within a programming language that does not allow manipulation of pointers outside of the context of a type system;

an allocation means for receiving a request to allocate a data object, the request including a specified size for the data object, and for allocating a space for the data object within the large array at a position specified by an array index within the large array, such that the space is large enough to accommodate the specified size for the data object, wherein the data object includes an identifier that uniquely identifies the data object, and wherein the data object includes a status bit that is used by a garbage-collection process; and an access means for receiving a request to access the data object, the request including the array index, and for using the array index to access the data object within the large array.

19. A computer readable storage medium containing a data structure for facilitating efficient programming, comprising:

a large array defined within a programming language that does not allow manipulation of pointers outside of the context of a type system;

a data object allocated within the large array at a position specified by an array index within the large array, such that the data object is accessible through the array index; and an object header within the data object containing the specified size of the data object, type information for data stored within the data object, an identifier that uniquely identifies the data object, and a status bit that is used during a garbage-collection process within the large array.

20. The method of claim 19, wherein the programming language includes the Java programming language.

* * * * *